(12) United States Patent
Esteva et al.

(10) Patent No.: US 12,079,311 B2
(45) Date of Patent: Sep. 3, 2024

(54) AI-ENHANCED DATA LABELING

(71) Applicant: Salesforce, Inc., San Francisco, CA (US)

(72) Inventors: Carlos Andres Esteva, Mountain View, CA (US); Douwe Stefan van der Wal, Amsterdam (NL)

(73) Assignee: Salesforce, Inc., San Francisco, CA (US)

( * ) Notice: Subject to any disclaimer, the term of this patent is extended or adjusted under 35 U.S.C. 154(b) by 262 days.

(21) Appl. No.: 17/145,123

(22) Filed: Jan. 8, 2021

(65) Prior Publication Data

US 2022/0222484 A1    Jul. 14, 2022

(51) Int. Cl.
| | | |
|---|---|---|
| *G06T 7/11* | (2017.01) | |
| *G06F 18/214* | (2023.01) | |
| *G06F 18/2413* | (2023.01) | |
| *G06F 18/40* | (2023.01) | |
| *G06N 3/08* | (2023.01) | |
| *G06T 7/00* | (2017.01) | |
| *G06V 10/25* | (2022.01) | |
| *G06V 10/40* | (2022.01) | |

(52) U.S. Cl.
CPC ........ *G06F 18/2413* (2023.01); *G06F 18/214* (2023.01); *G06F 18/40* (2023.01); *G06N 3/08* (2013.01); *G06T 7/0012* (2013.01); *G06T 7/11* (2017.01); *G06V 10/25* (2022.01); *G06V 10/40* (2022.01); *G06T 2207/20081* (2013.01); *G06T 2207/20084* (2013.01); *G06T 2207/30024* (2013.01); *G06V 2201/03* (2022.01)

(58) Field of Classification Search
None
See application file for complete search history.

(56) References Cited

U.S. PATENT DOCUMENTS

| | | | | |
|---|---|---|---|---|
| 10,943,346 | B2* | 3/2021 | Wirch | G06F 3/0485 |
| 11,138,477 | B2* | 10/2021 | Tandecki | G06F 18/24 |
| 11,367,184 | B2* | 6/2022 | Tosun | G06V 10/7784 |

(Continued)

FOREIGN PATENT DOCUMENTS

WO   WO-2015189264 A1 *  12/2015   ........... C12Q 1/6886

OTHER PUBLICATIONS

Aresta, G. et al., "BACH: Grand Challenge on Breast Cancer Histology Images," Medical Image Analysis, Jun. 2019, pp. 1-19.
(Continued)

*Primary Examiner* — Tsung Yin Tsai
(74) *Attorney, Agent, or Firm* — Haynes and Boone, LLP

(57) ABSTRACT

An AI-enhanced data labeling tool assists a human operator in annotating image data. The tool may use a segmentation model to identify portions to be labeled. Initially, the operator manually annotates portions and once the operator has labeled a sufficient number of portions, a classifier is trained to predict labels for other portions. The predictions generated by the classifier are presented to the operator for approval or modification. The tool may also include an active learning model that recommends portions of the image data for the operator to annotate next. The active learning model may suggest one or more batches of portions based on the extent to which, once labeled, those batches will increase the diversity of the total set of labeled portions.

20 Claims, 8 Drawing Sheets

(56) References Cited

U.S. PATENT DOCUMENTS

| | | | |
|---|---|---|---|
| 2014/0233826 A1* | 8/2014 | Agaian | G06V 20/698 382/133 |
| 2018/0315193 A1* | 11/2018 | Paschalakis | G06T 7/11 |
| 2019/0269485 A1* | 9/2019 | Elbaz | A61B 1/00016 |
| 2019/0355113 A1* | 11/2019 | Wirch | G06T 7/136 |
| 2020/0294231 A1* | 9/2020 | Tosun | G06V 20/69 |
| 2020/0388287 A1* | 12/2020 | Anushiravani | G16H 20/10 |
| 2021/0049664 A1* | 2/2021 | Lundgaard | G06F 16/90344 |
| 2022/0189016 A1* | 6/2022 | Barnes | G06F 18/211 |
| 2022/0222815 A1* | 7/2022 | Zeineh | G06V 10/82 |

OTHER PUBLICATIONS

Aubreville, M. et al., "SlideRunner—A Tool for Massive Cell Annotations in Whole Slide Images," Bildverarbeitung in der Medizin 2018, Feb. 7, 2018, pp. 1-6.

Bankhead, P. et al., "QuPath: Open source software for digital pathology image analysis," Scientific Reports, vol. 7, Article No. 16878, Dec. 4, 2017, pp. 1-7.

Beveridge, T.J. et al., "Sampling and Staining for Light Microscopy," Methods for General and Molecular Microbiology, Aug. 17, 2007, pp. 19-33.

Christiansen, E.M. et al., "In Silico Labeling: Predicting Fluorescent Labels in Unlabeled Images," Cell, vol. 173, Apr. 18, 2018, pp. 792-803.

Dellon, E.S., "Eosinophilic esophagitis: Diagnostic tests and criteria," Curr Opin Gastroenterol. 28(4), Jul. 2012, pp. 382-388.

Ellis, M.J. et al., "Ki67 Proliferation Index as a Tool for Chemotherapy Decisions During and After Neoadjuvant Aromatase Inhibitor Treatment of Breast Cancer: Results From the American College of Surgeons Oncology Group Z1031 Trial (Alliance)," Journal of Clinical Oncology, vol. 35, No. 10, Apr. 1, 2017, pp. 1061-1069.

Esteva, A. et al., "Dermatologist-level classification of skin cancer with deep neural networks," Nature, vol. 542, Jan. 25, 2017, pp. 1-11.

Gamper, J. et al., "PanNuke: An Open Pan-Cancer Histology Dataset for Nuclei Instance Segmentation and Classification," European Congress on Digital Pathology, Jul. 3, 2019, pp. 11-19.

Goodfellow, I.J. et al., "Generative Adversarial Nets," Advances in Neural Information Processing Systems, Jun. 2014, pp. 1-9.

Graham, S. et al., "HoVer-Net: Simultaneous Segmentation and Classification of Nuclei in Multi-Tissue Histology Images," Medical Image Analysis, vol. 58, Dec. 2018, pp. 1-18.

He, K. et al., "Deep Residual Learning for Image Recognition," Proceedings of the IEEE Conference on Computer Vision and Pattern Recognition (CVPR), 2016, pp. 770-778.

He, X. et al., "AutoML: A survey of the state-of-the-art," Knowledge-Based Systems, vol. 212, Nov. 24, 2020, pp. 1-27.

Hendry, S. et al., "Assessing Tumor-infiltrating Lymphocytes in Solid Tumors: A Practical Review for Pathologists and Proposal for a Standardized Method From the International Immunooncology Biomarkers Working Group: Part 1: Assessing the Host Immune Response, TILs in Invasive Breast Carcinoma and Ductal Carcinoma In Situ, Metastatic Tumor Deposits and Areas for Further Research," Adv Anat Pathol. 24(5), Sep. 2017, pp. 235-251.

Jing, L. et al., "Self-supervised Visual Feature Learning with Deep Neural Networks: A Survey," arXiv:1902.06162, Feb. 16, 2019, pp. 1-24.

Lecun, Y. et al., "Deep Learning," Nature, vol. 251, May 28, 2015, pp. 436-444.

Litjens, G. et al., "1399 H&E-stained sentinel lymph node sections of breast cancer patients: the CAMELYON dataset," GigaScience, vol. 7, Issue 6, Jun. 2018, pp. 1-8.

Litjens, G. et al., "A survey on deep learning in medical image analysis," Medical Image Analysis, vol. 42, Dec. 2017, pp. 60-88.

Mcquin, C. et al., "CellProfiler 3.0: Next-generation image processing for biology," PLOS Biology, Jul. 3, 2018, pp. 1-17.

Nagpal, K. et al., "Development and validation of a deep learning algorithm for improving Gleason scoring of prostate cancer," NPJ Digital Medicine, vol. 2, Article No. 48, Jun. 7, 2019, pp. 1-10.

Nalisnik, M. et al., "Interactive phenotyping of large-scale histology imaging data with HistomicsML," Scientific Reports, vol. 7, Article No. 14588, Nov. 6, 2017, pp. 1-12.

Ronneberger, O. et al., "U-Net: Convolutional Networks for Biomedical Image Segmentation," arXiv:1505.04597, May 18, 2015, pp. 1-8.

Russakovsky, O. et al., "ImageNet Large Scale Visual Recognition Challenge," Int J Comput Vis, vol. 115, Apr. 11, 2015, pp. 211-252.

Sener, O. et al., "Active Learning for Convolutional Neural Networks: A Core-Set Approach," arXiv:1708.00489, Feb. 21, 2018, pp. 1-13.

Slaoui, M. et al., "Histopathology Procedures: From Tissue Sampling to Histopathological Evaluation," Drug Safety Evaluation: Methods and Protocols, Methods in Molecular Biology, vol. 691, Sep. 30, 2010, pp. 69-82.

Smits, A., "The estimation of tumor cell percentage for molecular testing by pathologists is not accurate," Modern Pathology, vol. 27, Jul. 26, 2013, pp. 168-174.

Vanschoren, J., "Meta-learning: A Survey," arXiv:1810.03548, Oct. 8, 2018, pp. 1-29.

Verma, R. et al., "Multi-organ Nuclei Segmentation and Classification Challenge 2020," Feb. 2020, pp. 1-4.

Veta, M. et al., "Predicting breast tumor proliferation from whole-slide images: The TUPAC16 challenge," Medical Image Analysis, vol. 54, May 2019, pp. 111-121.

Weinstein, J. N. et al., "The Cancer Genome Atlas Pan-Cancer analysis project," Nature Genetics, vol. 45, Sep. 26, 2013, pp. 1113-1120.

* cited by examiner

AI-ENHANCED DATA LABELING

BACKGROUND

1. Technical Field

The subject matter described relates generally to data labeling and, in particular, to using artificial intelligence (AI) to provide an enhanced data labeling tool.

2. Background Information

A broad swath of machine learning techniques rely on the availability of labeled data to train a model. For many use cases, broad adoption of machine-learning techniques has been impeded by a shortage of readily available labeled data. For example, in the context of biological microscopy, it is common to generate image datasets containing millions of cells and structures. However, it is challenging to obtain large-scale high-quality annotations to train AI models to aid in the analysis of the datasets.

SUMMARY

The above and other problems may be addressed by an AI-enhanced data labeling system and method. The AI-enhanced data labeling system assists a human operator in labeling data. In various embodiments, a segmentation model is applied to image data to identify portions to be labeled. The operator begins labeling portions of the image data manually. The labels provided by the operator are used to train a classifier to generate recommendations for labels to apply to other portions of the image data. These recommendations are presented to the operator, who can approve or modify them rather than providing each new label from scratch. An active learning model may be used to recommend portions of the image data that the operator should analyze next. Thus, the active learning model may guide the operator around the image to provide rapid sampling of a diverse and representative set of portions.

In one embodiment, the AI-enhanced data labeling system segments the image data into image portions and receives user-generated labels for a first subset of the image portions. A machine-learned classifier is trained using the labeled first subset of the image portions and applied to a second subset of the image portions to generate recommended labels for at least some of the second subset of the image portions. The AI-enhanced data labeling system labels the second subset of image portions based on user input accepting or modifying the recommended labels. Once a threshold number of the second subset of image portions have been labeled, the AI-enhanced data labeling system retrains the machine-learned classifier using the labeled second subset of the image portions.

DETAILED DESCRIPTION

Figure 1:
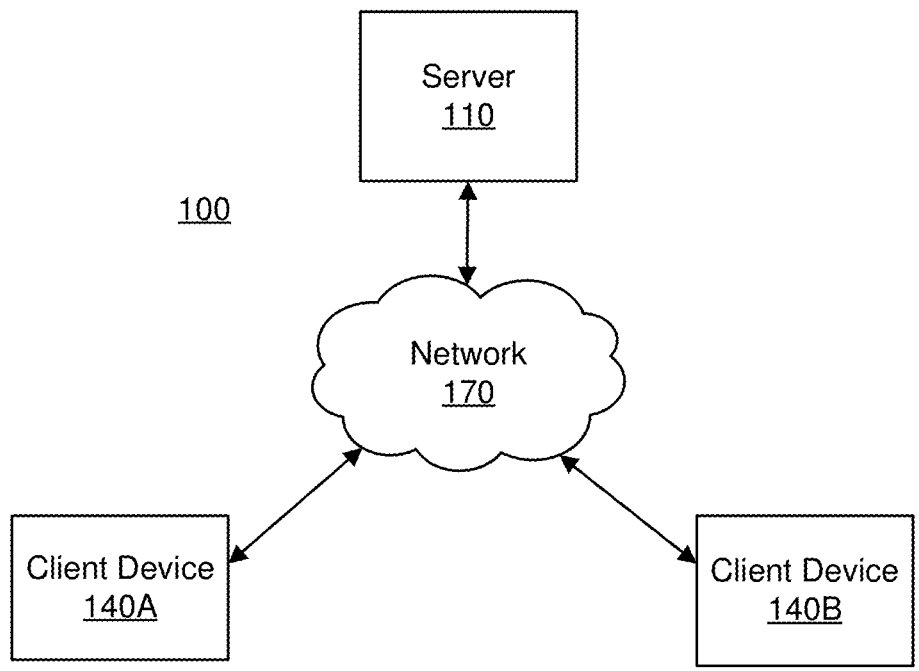
FIG. 1 is a block diagram of an AI-enhanced data labeling system, according to one embodiment.

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

OVERVIEW

The following description describes various embodiments of an AI-enhanced data labeling tool in the context of biological image data. However, it should be appreciated that the same or similar techniques may be applied to annotate other kinds of data in the same or different contexts. For example, alternative embodiments of the AI-enhanced data labeling tool may be used to annotate different types of vehicles in traffic camera data, identify different styles of music or artists in audio data, classify features in astronomical data, etc.

The microscopic imaging of tissue, cells, and other relevant biological specimens is valuable in many areas of biological and medical research. Various techniques may be applied to aid in distinguishing and analyzing structures of interest. For example, molecular staining protocols use chemical stains that selectively highlight different aspects of tissue (e.g. cell types, structures, organoids, etc.). Such protocols have a wide range of uses, from basic research to medical diagnostics. Furthermore, sample preparation has become standardized in a variety of domains (e.g. slide preparation in histopathological analysis), enabling the large-scale digitization of data.

Digitization has fueled the advancement of computational methods to analyze data using a variety of techniques. Machine learning (e.g., deep learning) methods have spurred progress across many fields, particularly those that generate large amounts of digital data. Visual biology is one such field where machine learning techniques can provide significant value. Supervised learning, in which computational models are trained using data points (e.g. histopathology images, raw microscopy images, etc.) and data labels (e.g. 'cancerous' vs 'benign,' virtual staining highlighting structures of interest, etc.), has been widely adopted in biology. Biologists have the advantage of being able to generate massive amounts of data. A single microscopy image can yield a gigabyte of visual data for algorithms to learn from.

However, biologists also face a significant obstacle in the difficulty and cost of obtaining complete annotations for datasets. Consider the ImageNet Large-scale Visual Recognition Challenge (ILSVRC), a benchmark competition for object classification, localization, and detection in images of normal every-day objects (animals, furniture, etc.). It offered competitors a dataset of approximately one million images from one thousand object classes, made possible by the use of crowdsourced annotations from thousands of non-expert individuals. In contrast, computational biology competitions typically offer only hundreds to thousands of labeled examples.

A common approach for generating labeled data is to have humans manually annotate a training dataset that is then used to train a model. However, this can be time-consuming and expensive. For many biological applications, generating accurate labels involves skilled experts (e.g., pathologists) annotating training data. These experts typically charge hundreds of dollars an hour for their work. Furthermore, the data annotation often involves close inspection of the image data and thus takes longer to generate per label than in other fields. Consequently, the cost of obtaining annotated training data rapidly becomes prohibitive as the size of the training data set increases.

Various embodiments of the AI-enhanced data labeling tool assist a human operator in annotating cells or other biological structures. The tool uses a segmentation model to segment image data into portions that each depict a single cell or other biological structure of interest. Initially, the operator manually annotates portions based on the depicted cells. Once the operator has labeled sufficient portions, a classifier is trained to predict labels for other portions. The predictions generated by the classifier are presented to the operator for approval or modification. The tool may also include an active learning model that recommends portions of the image data for the operator to annotate next. The active learning model may suggest one or more batches of portions based on the extent to which, once labeled, those batches will increase the diversity of the total set of labeled portions. Thus, the AI-enhanced labeling tool may enable the operator to annotate more examples in a given time period, reducing the cost of data annotation. The tool may also increase accuracy of the labels assigned to image portions.

Example System

FIG. 1 illustrates one embodiment of an AI-enhanced data labeling system 100. In the embodiment shown, the AI-enhanced data labeling system 100 includes a server 110, a first client device 140A, and a second client device 140B, all connected via a network 170. Although two client devices 140 are shown, in practice the system 100 may include any number of client devices. In other embodiments, the AI-enhanced data labeling system 100 includes different or additional elements. In addition, the functions may be distributed among the elements in a different manner than described. For example, although FIG. 1 depicts a networked configuration, in one embodiment, a standalone computing device provides the functionality attributed herein to both the server 110 and client devices 140.

The server 110 includes one or more computing devices that store and process image data to drive an annotation interface presented to an operator at one or more client devices 140. In one embodiment, the server 110 uses three machine learning models to process the image data: a segmentation model, a classifier, and an active learning model. The segmentation model segments the image data to identify portions that depict a cell or other biological structure of interest, the classifier generates predicted labels for the segmented portions, and the active learning model suggests portions to present next to the operator for labeling. Various embodiments of the server and each of these models are described in greater detail below, with reference to FIG. 2.

The client devices 140 are computing devices with which operators interact with the AI-enhanced data labeling system 100. The client devices 140 are typical desktop terminals but other types of computing device may be used, such as laptops, tablets, or the like. The client devices 140 execute software that provides a user interface in which the operator is presented with portions of the image data and provided controls for annotating the portions. For example, the software may be a browser or dedicated application that retrieves portions of the image data, suggested labels, recommended portions of the image data to annotate next, and any other relevant information from the server 110. The software may also send labels confirmed or provided by the operator back to the server 110. Various embodiments of the user interface are described in greater detail below, with reference to FIGS. 3 and 4.

The network 170 provides the communication channels via which the other elements of the AI-enhanced data labeling system 100 communicate. The network 170 is typically the internet but can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, 3G, 4G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Figure 2:
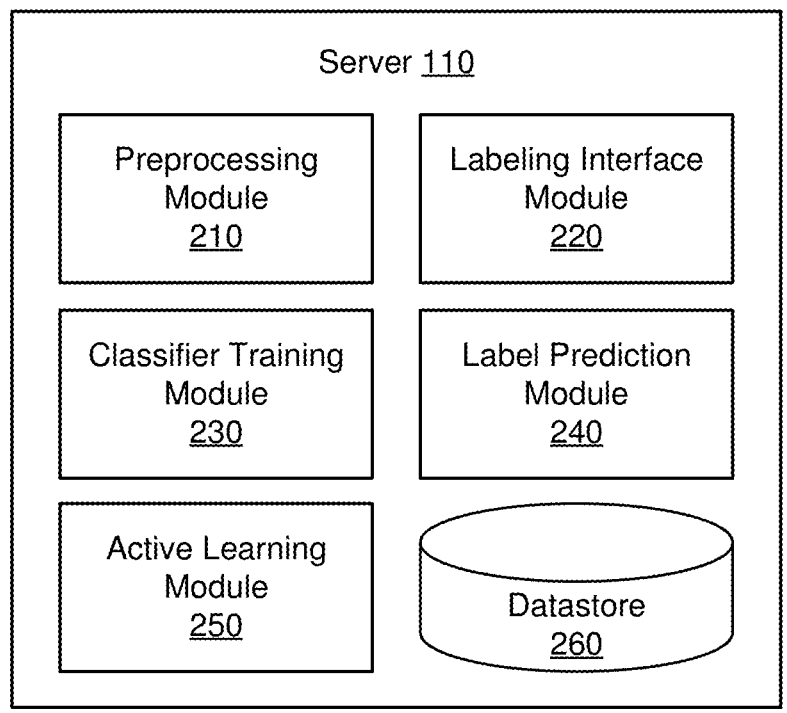
FIG. 2 is a block diagram of the server of FIG. 1, according to one embodiment.

FIG. 2 illustrates one embodiment of the server 110. In the embodiment shown, the server 110 includes a preprocessing module 210, a labeling interface module 220, a classifier training module 230, a label prediction module 240, an active learning module 250, and a datastore 260. In other embodiments, the AI-enhanced data labeling system 100 includes different or additional elements. In addition, the functions may be distributed among the elements in a different manner than described.

The preprocessing module 210 retrieves image data (e.g., from the datastore 260) and performs preprocessing on the retrieved image data. The preprocessing can include data normalization such as modifications to the brightness, contrast, color, scale, and orientation of the image data as well as performing skew and other error-correction operations. The preprocessing can also include applying a segmentation model to the image data to identify portions of the image data that depict biological structures of interest. For example, if the image data corresponds to one or more microscopy scans of a tissue sample that has been stained to highlight cells, the segmentation model may identify portions each depicting a single cell within the tissue sample. The identified portions may be represented by a position (e.g., pixel coordinates) of one corner of a rectangle along with the height and width of the rectangle, the positions of two or more vertices of a regular polygon, a list of pixels forming the outline of the portion, or any other suitable method for defining a subset of the image data.

In one embodiment, the segmentation model is a trained machine learning model (e.g., Hover-Net). In particular, the segmentation model is trained using a supervised learning technique with one or more manually segmented images. Manually segmented images are more readily available than images that are labeled with more scientifically significant labels (e.g., cancerous versus non-cancerous cells) as this task can be performed with relatively little training or experience. The preprocessing module 210 may have different trained models for different stain types, but each model may be applicable to multiple tissue types that are stained with the corresponding stain type. Alternatively, a single model may be retrained as needed when samples using different stain types are analyzed.

The labeling interface module 220 generates information for displaying subsets of the segmented portions of the image data to an operator for annotation. In one embodiment, the labeling interface module 220 identifies a region within the image that includes one or more portions to be annotated and causes a client device 140 to display the identified region in conjunction with controls that enable the operator to annotate the portions. Alternatively, the identified region may be displayed locally (e.g. in embodiments where the AI-enhanced data labeling tool is provided by a standalone computing device).

When a session begins, the portions to be annotated may be presented to the operator for labeling without recommendations. The labeling interface module 220 receives data indicating the labels assigned to portions by the operator. The classifier training module 230 trains a classifier using the assigned labels. The labels provided by the operator may be split into training and validation sets (e.g., 75% of the labels may be used for training and the other 25% validation). When the classes are not balanced, the less common classes may be oversampled to present the model with a more balanced dataset.

The label prediction module 240 applies the classifier to portions of the image data to predict the corresponding labels. The predictions may include a predicted label and corresponding probability or a probability that each of a set of possible labels apply to a portion. When one or more training criteria are met, the labeling interface module 220 begins to provide the predicted labels for display to the operator in conjunction with controls for conveniently confirming the predicted label is correct (e.g., with a single button press or click) or modifying the predicted label (e.g., by selecting an alternative label from a drop down list). The training criteria may include one or more of a total number of labels provided by the operator, a degree of agreement between the predictions generated by the classifier and the labels provided by the operator for a validation set, a metric indicating average confidence in the predictions generated by the classifier, or the like.

The classifier training module 230 may iteratively retrain the classifier using the additional labels as confirmed or modified by the operator as further training data. In one embodiment, the classifier training module 230 retrains the classifier after a predetermined number (e.g., five, ten, twenty, etc.) of additional portions of the image data have been labeled. The classifier training module 230 may perform this retraining in the background or in parallel with the operator annotating additional portions. Thus, the updated classifier may be provided to the operator with little or no interruption to the annotation process. Additionally or alternatively, other criteria may be used to determine when to retrain the classifier, such as an amount of time passed since the previous training, a threshold criteria for diversity among annotated images being met, a threshold number of modifications to suggested annotation labels by the operator, or operator selection of a "retrain classifier" option within the annotation interface.

In one embodiment, the classifier is a partially trained neural network (e.g., ResNet-18). Prior to deployment in the AI-enhanced data labeling system 100, the neural network is initialized. The initialization process includes pretraining the neural network using a general dataset of labeled data that includes a range of tissue and cell types (e.g., the PanNuke dataset). The general dataset is typically not limited to the specific task or tasks for which the neural network is being prepared to perform. After pretraining, the layers of the neural network are frozen and the neural network is modified by replacing one or more of the pretrained layers with two or more untrained layers (which are not frozen). For example, the final layer of the pretrained neural network may be replaced with two fully-connected layers (e.g., each having 32 nodes) and a final output layer with nodes corresponding to classifications used in the target task. The modified, pretrained neural network is then fine-tuned for the target task using the labels provided by the operator, as described above, adjusting only the unfrozen layers (e.g., those that were added after pretraining). Because the neural network was pretrained, it can provide useful predictions after training using a small number of operator-provided labels (e.g., ten or twenty, etc.).

The active learning module 250 recommends portions of the image data for the operator to label next. The active learning module 250 considers both the labeled and unlabeled portions of the data set to suggest one or more batches of portions based on the extent to which, once labeled, those batches will increase the diversity of the total set of labeled portions. In various embodiments, the active learning module 250 receives as input feature vectors of portions of the image data generated by the classifier. The feature vectors may be the output of an intermediate layer of the classifier. For example, in the embodiment described previously where the final layer of a pretrained classifier is replaced by a pair of fully connected layers, the feature vectors may be the output of the first fully connected layer in the pair.

In one embodiment, the active learning module 250 recommends a region of the image of predetermined size that includes one or more cells for the operator to label. To do this, the active learning module 250 identifies a set of unlabeled datapoints, each corresponding to a portion of the image, that is expected to most improve the performance and generalizability of a classifier model trained on the already labeled portions and the subset of unlabeled portions (once labeled). The expected impact of an unlabeled datapoint may be parameterized as a combination of a predicted label for that portion, the number of examples of the predicted label already present in the labeled data, and the frequency with which the operator disagrees with predictions of that label. The active learning module 250 may navigate the operator to regions of the image containing each unlabeled datapoint in turn. Alternatively, the active learning module 250 may identify a region of the image that contains a subset of the identified unlabeled datapoints that will most impact the performance and generalizability of the classifier model.

The datastore 260 includes one or more computer-readable media that store the data and models used by the other components of the server 110. For example, the data store 260 may be a solid-state memory or hard drive that stores the image data, assigned labels, segmentation model, classifier, and active learning model. Although the datastore 260 is shown as a single entity that is part of the server 110, in some embodiments, the datastore includes a distributed database spread across multiple computing devices and accessed via the network 170.

Example Workflow and User Interface

Figure 3:
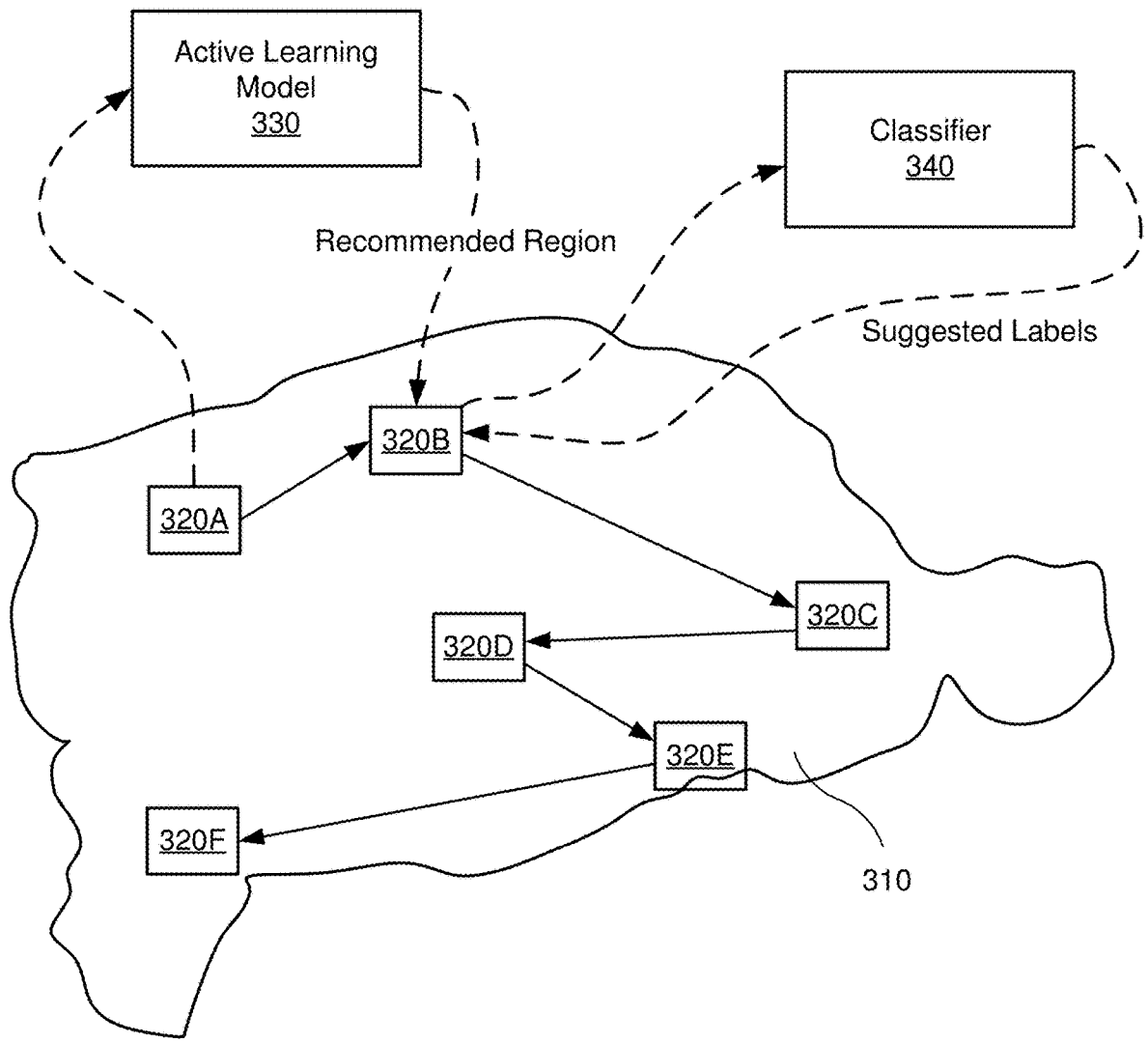
FIG. 3 illustrates the use of an active learning model and a classifier in the AI-enhanced labeling system, according to one embodiment.

FIG. 3 illustrates an example workflow using an active learning model and a classifier to enhance a data labeling tool. In the embodiment shown, the image data represents a microscopy image of a tissue sample 310. When the operator begins working on the tissue sample 310, the user interface displays a first region 320A of the tissue sample that includes multiple segmented portions, each corresponding to a cell. The operator assigns labels to at least some of the portions. These labels are used to fine-tune a classifier 340 for use on the tissue sample 310.

The classifier 340 generates feature vectors for at least some of the portions of the first region 320A. The feature vectors are provided to an active learning model 330 that recommends a second region 320B of the tissue sample 310 for the operator to label next. In one embodiment, the operator can either follow the recommendation or manually select an alternative region to label next. Assuming the operator moves onto the second region 320B that includes multiple additional unlabeled portions. The classifier 340 generates recommended labels for at least some of the additional unlabeled portions that the operator either approves or modifies.

This process iterates, with the active learning model 330 recommending a third region 320C, fourth region 320D, fifth region 320E, sixth region 320F, etc. In other words, the active learning model 330 guides the operator around the image of the tissue sample 310 by identifying good candidates for regions to annotate. This enables the operator to more rapidly sample a diverse and representative set of portions than is likely were the operator to navigate the image manually. Furthermore, the classifier 340 generates recommended labels for the portions of each region, accelerating the annotation process over what is likely if the operator were to assign each label unaided. As described previously, the classifier 340 may be iteratively retrained using the labels assigned by the operator (whether by approving or modifying suggestions made by the classifier). Thus, the combination of the active learning model 330 and classifier 340 provides the operator with a personalized AI-enhanced tool that enables the operator to generate a high-quality labeled dataset for an otherwise intractably large image.

Figure 4:
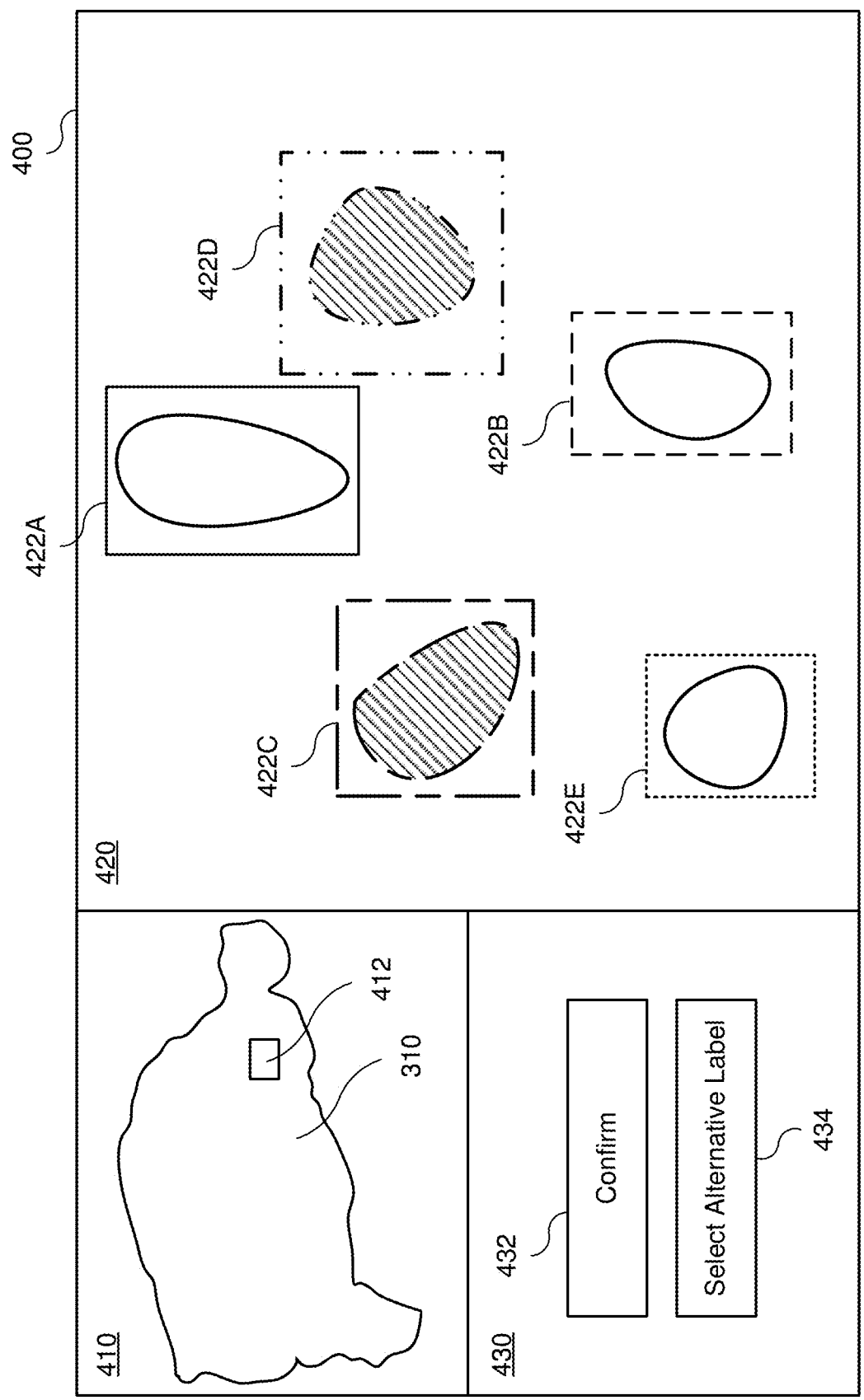
FIG. 4 illustrates an example user interface for an AI-enhanced labeling system, according to one embodiment.

FIG. 4 illustrates an example user interface 400 that the operator may use to annotate image data. For example, the user interface 400 may be displayed on a screen of a client devices 140. In the embodiment shown, the user interface 400 is divided into three parts: a global view 410, a region view 420, and a control area 430. In other embodiments, the user interface 400 may include different or additional elements. Furthermore, the elements may be arranged differently relative to one another.

The global view 410 displays the whole (or at least a large portion of) of the image being annotated. In this case, the image of the tissue sample 310 shown in FIG. 3 is being annotated. The global view 410 also includes an indicator 412 of the current region being annotated. The global view 410 provides context to operator. Furthermore, the operator may manually navigate the image data by moving the indicator 412 (e.g., by dragging the indicator or clicking on a position in the global view).

The region view 420 displays a zoomed in view of the current region. In FIG. 4, the current region includes five portions to be labeled 422. Each portion 422 depicts a cell. One or more visual properties of a portion 422 may be adjusted to indicate an assigned or suggested label for the portion. In FIG. 4, the visual property that is varied is the outline style of the portions 422. In particular, a first portion 422A has already been labeled by the operator as depicting a first type of cell and has a first outline style. The classifier 340 has generated a suggestion that a second portion 422B also depicts the first type of cell, but the operator has not yet approved the suggestion, so the second portion has a second outline style. Similarly, a third portion 422C is confirmed as depicting a second type of cell and has a third outline style while a fourth portion 422D has an unapproved suggestion that is also depicts the second type of cell, so has a fourth outline style. The classifier 340 was unable to generate a prediction for a fifth portion 522E with sufficient confidence to display a suggestion, so the fifth portion has a fifth outline style. Although FIG. 4 illustrates changing the outline style of portions 422, a wide range of visual properties may be varied to convey information about the portions. For example, in one embodiment, the color of the outline indicates a cell type while the intensity of the color indicates whether the cell type is suggested or approved (e.g., suggestions are represented by a pale or thin outline while confirmed labels are represented by a darker or thicker outline).

The controls area 430 includes controls with which the operator can assign labels to portions 422. In the embodiment shown, the controls area 430 includes a first button 432 to confirm a suggested label and a second button 434 to select an alternative label. For example, selection of the second button 434 may cause the display of a list of possible labels. The list may be sorted alphabetically, by probability that the label applies (e.g., as determined by the classifier 340), or in any other suitable order. A currently selected portion 422 may be identified in the region view 420 (e.g., by highlighting or otherwise distinguishing the current portion) and the user interface 400 may cycle through all of the cells automatically as the operator applies labels to each one. Additionally or alternatively, the controls area 430 may include additional controls for selecting which portion 422 to annotate or the operator may select a portion in the region 420 (e.g., by clicking on or otherwise selecting the portion).

Example Methods

Figure 5:
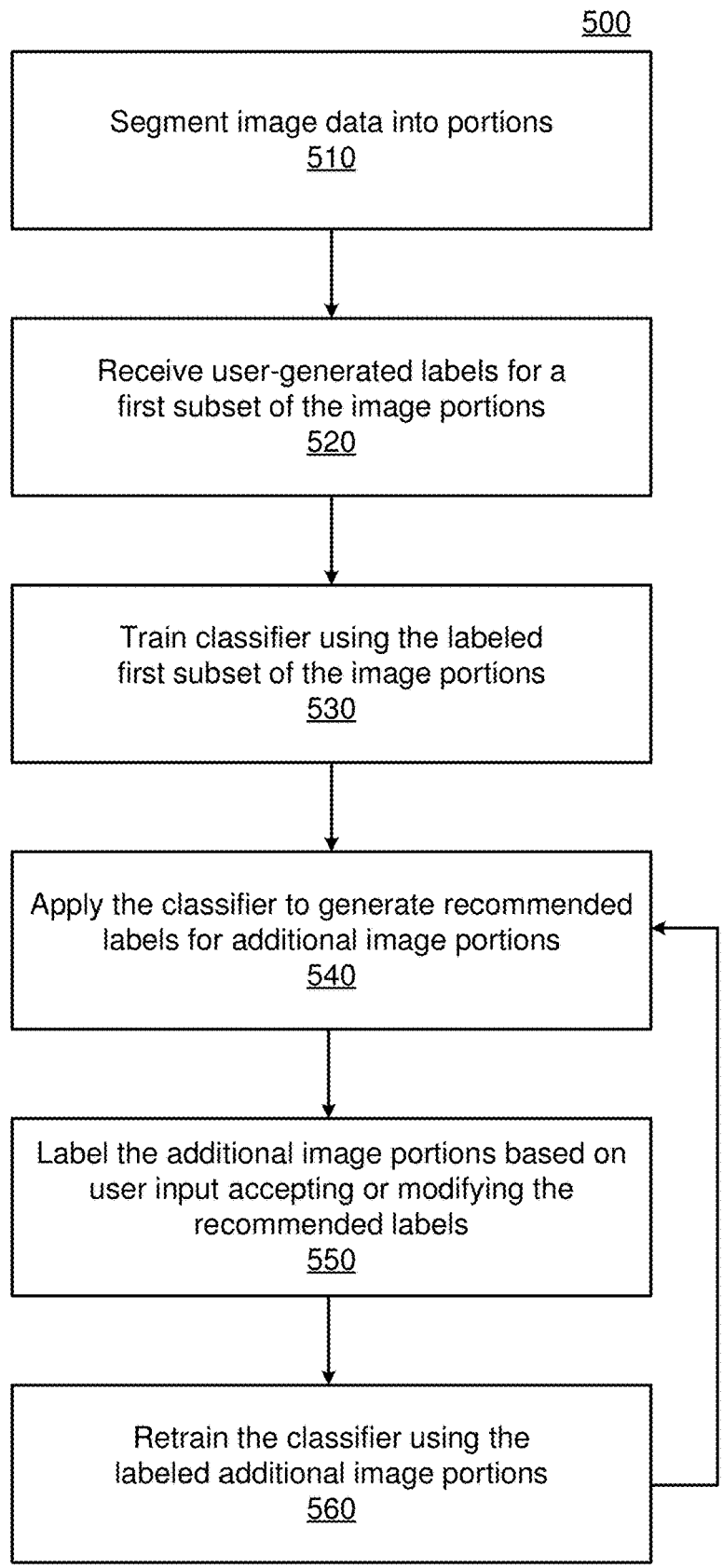
FIG. 5 is a flowchart of a method for annotating image data using a dynamically trained classifier, according to one embodiment.

FIG. 5 illustrates a method 500 for annotating image data using a dynamically trained classifier, according to one embodiment. The steps of FIG. 5 are illustrated from the perspective of various elements of the server 110 performing the method 500. However, some or all of the steps may be performed by other entities or components. In addition, some embodiments may perform the steps in parallel, perform the steps in different orders, or perform different steps.

In the embodiment shown in FIG. 5, the method 500 begins with the preprocessing module 210 segmenting 510 the image data into portions. Each portion depicts a biological structure of interest, such as a cell. Note that not all of the image data is necessarily included in one of the segmented portions. Some of the image data may be background image data that is not included in any portion.

Furthermore, in some embodiments, portions may overlap. For example, where two cells are close together and two geometric shapes (e.g., rectangles) cannot be placed to fully encompass the corresponding cells without overlapping.

At this stage, the classifier has been pretrained but is not yet fine-tuned. Therefore, a first subset of the image portions may be presented to an operator (e.g., at a client device 140) for manual annotation. The labeling interface module 220 receives 520 user-generated labels for the first subset of the image portions. The classifier training module 230 uses at least some of the labeled first subset of image portions to train 530 the classifier.

Assuming the classifier is determined to be sufficiently trained (e.g., if the classifier achieves at least a threshold accuracy on a validation set selected from among the first subset of labeled image portions), the label prediction module 240 applies 540 the classifier to a second subset of image portions to generate recommended labels. The recommended labels are provided for display to the operator. The label interface module 220 labels 550 at least some of the second subset of image portions based on user input accepting or modifying the recommended labels. For example, the operator may approve a first recommendation and change a second recommendation to correct an error.

When one or more retraining criteria are met, the classifier training module 230 retrains 560 the classifier using available labeled image portions, including at least some of the labeled second subset of image portions. The retraining criteria may include one or more of a total number of labels provided since a previous training (e.g., five, ten, or twenty), an amount of time passed since the previous training, or operator selection of a "retrain classifier" option within the annotation interface. The method 500 may iterate through the steps of applying 540 the classifier to additional portions of image data, labeling 550 the additional portions based on user input, and retraining 560 the classifier using the labeled additional portions until the annotation session is ended (e.g., by the operator closing the annotation software).

Figure 6:
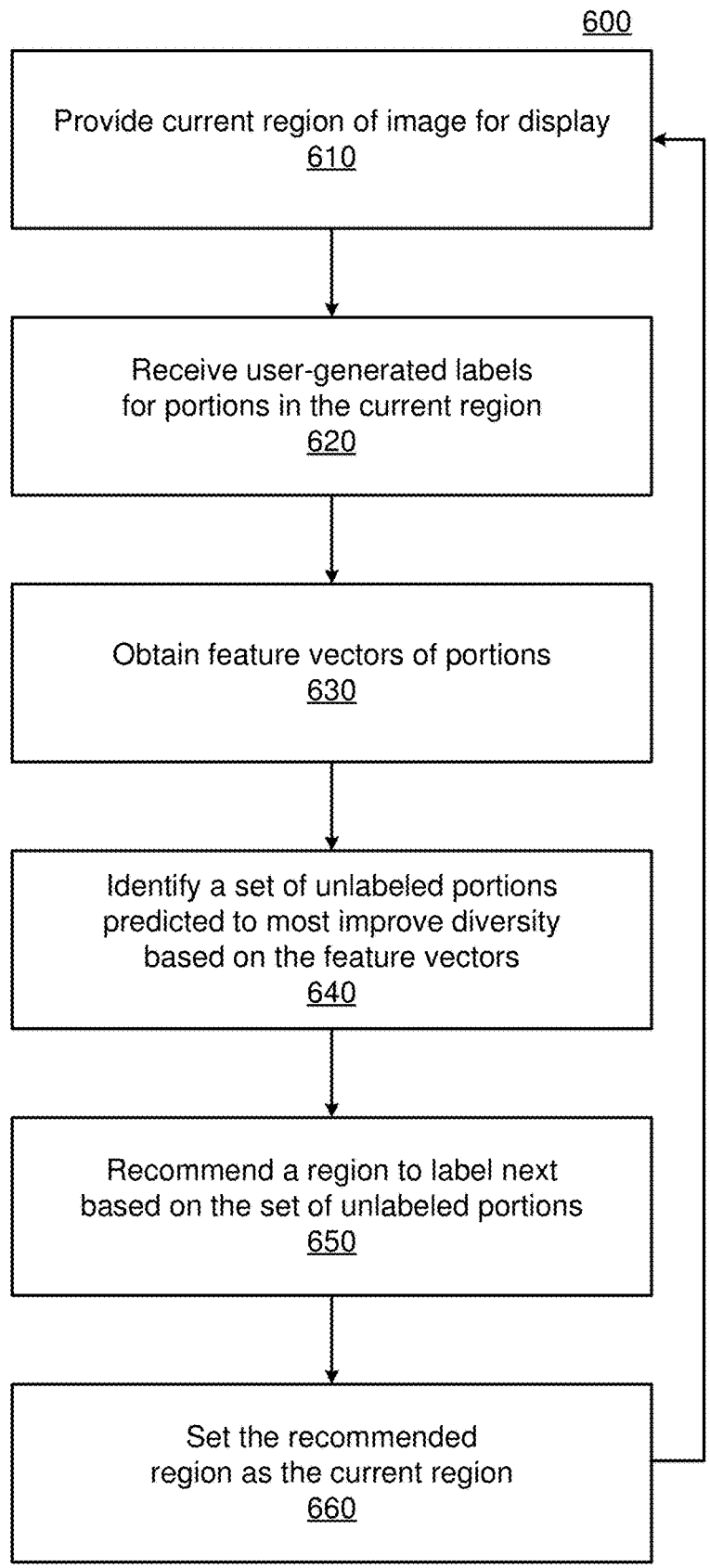
FIG. 6 is a flowchart of a method for suggesting a region of an image to annotate next, according to one embodiment.

FIG. 6 illustrates a method 600 for suggesting portions of the image data to annotate next, according to one embodiment. The steps of FIG. 6 are illustrated from the perspective of the server 110 performing the method 600. However, some or all of the steps may be performed by other entities or components. In addition, some embodiments may perform the steps in parallel, perform the steps in different orders, or perform different steps.

In the embodiment shown in FIG. 6, the method 600 begins with the server 110 providing 610 a current region of an image being annotated for display. For example, the server 110 may send image data for the current region or data indicating a position of the current region to a client device 140.

The server 110 receives 620 user-generated labels for portions in the current region. For example, an operator may select labels for the portions (either manually or with the aid of recommendations generated by a classifier) via user input at the client device 140 and the client device may send the selected labels to the server 110.

The server 110 obtains 630 feature vectors for the portions, including at least some of the labeled portions and some unlabeled portions. In one embodiment, the feature vectors are generated by performing a feedforward pass over the portions (labeled and unlabeled) with the classifier. As described previously, the feature vectors may be the output of an intermediate layer of the classifier.

The server 110 identifies 640 a subset of unlabeled portions that are predicted to most improve diversity based on the feature vectors and recommends 650 a region to label next based on the subset of unlabeled portions. In one embodiment, the server 110 selects a region that contains the portions of the image data corresponding to one or more of the set of unlabeled portions as the recommended region. The server 110 sets 660 the recommended region as the current region and the method 600 repeats until an end condition is reached (e.g., the operator closes the annotation software).

Experimental Validation

Figure 7:
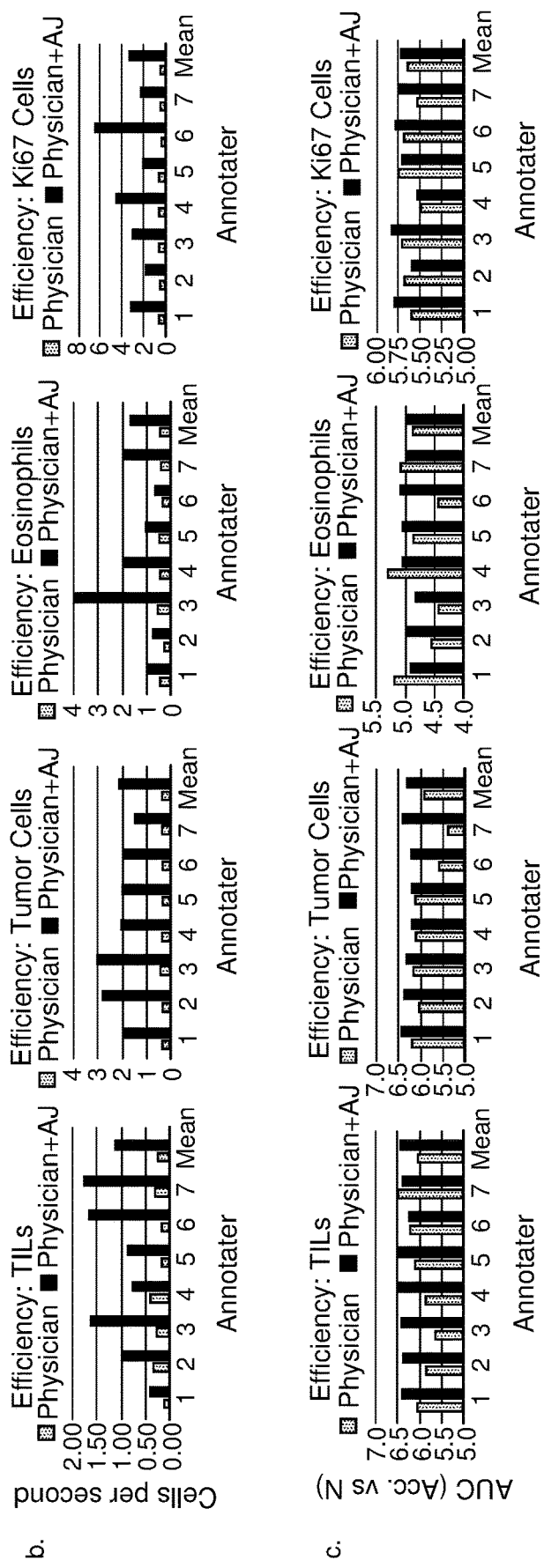
FIG. 7 illustrates experimental data demonstrating efficiency improvements that may be realized using the AI-enhanced data labeling system, according to one embodiment.

FIG. 7 includes experimental data demonstrating efficiency improvements that may be realized using one embodiment of the AI-enhanced data labeling tool. FIG. 7 includes experimental data for four example use cases: tumor infiltrating lymphocytes (TILs), tumor cells, eosinophils, and Ki67 cells. In each use-case, the annotator labels two classes of cells: (1) the cell type of interest (2) all other cells in the tissue. All four use cases are real tasks with diagnostic value. The first three are stained with H&E, while the fourth is stained with IHC and demonstrates generalizability of the approach across stain types.

The results of these experiments are summarized in the table at the top of FIG. 7. The efficiency boost across operators ranges from 3.83× to 8.03× their original efficiency, as measured by the number of cells per second annotated. The average efficiency boost is 5.15×. Intuitively, the efficiency boost is greater on tasks with greater visual differences between the two classes. Eosinophils (3.83× boost) are a type of white blood cell with multi-lobulated nuclei and granular eosinophilic cytoplasm. In contrast, the Ki-67 staining protein selectively attaches to proliferating cells. This intensity difference simplifies the Ki-67-based task (8.03× boost) of distinguishing proliferating cells from non-proliferating cells. TILs (4.46× boost) and Tumor Cells (6.16× boost) lie around the average value. Individual efficiency boosts across the use-cases are shown in the charts in the middle row of FIG. 7. Variability can be observed within each use-case. Behaviorally, individual operators interact differently with the interface, gaining or losing trust in model predictions as a function of model accuracy.

The charts in the bottom row of FIG. 7 demonstrate the effectiveness boost provided by using the AI-enhanced data labeling tool. The effectiveness boost across operators ranges from 1.38% to 6.43%, averaging 4.34%. The effectiveness of an annotated dataset is defined as the area under the curve (AUC) of validation accuracy versus N, the number of training samples, with N<200, for a model trained with this dataset. The AUC of such a curve yields an intuitive measure of how quickly the dataset becomes of sufficient quality to learn the task at hand. The higher the AUC, the faster a model converges, and the fewer data points are needed to learn the distribution. The exact impact of this value on the accuracy improvement of a model trained on the annotated dataset is a function of the individual shapes of the AUC curves. The effectiveness improvement in one annotated dataset over another is then the AUC ratio between them.

Figure 8:
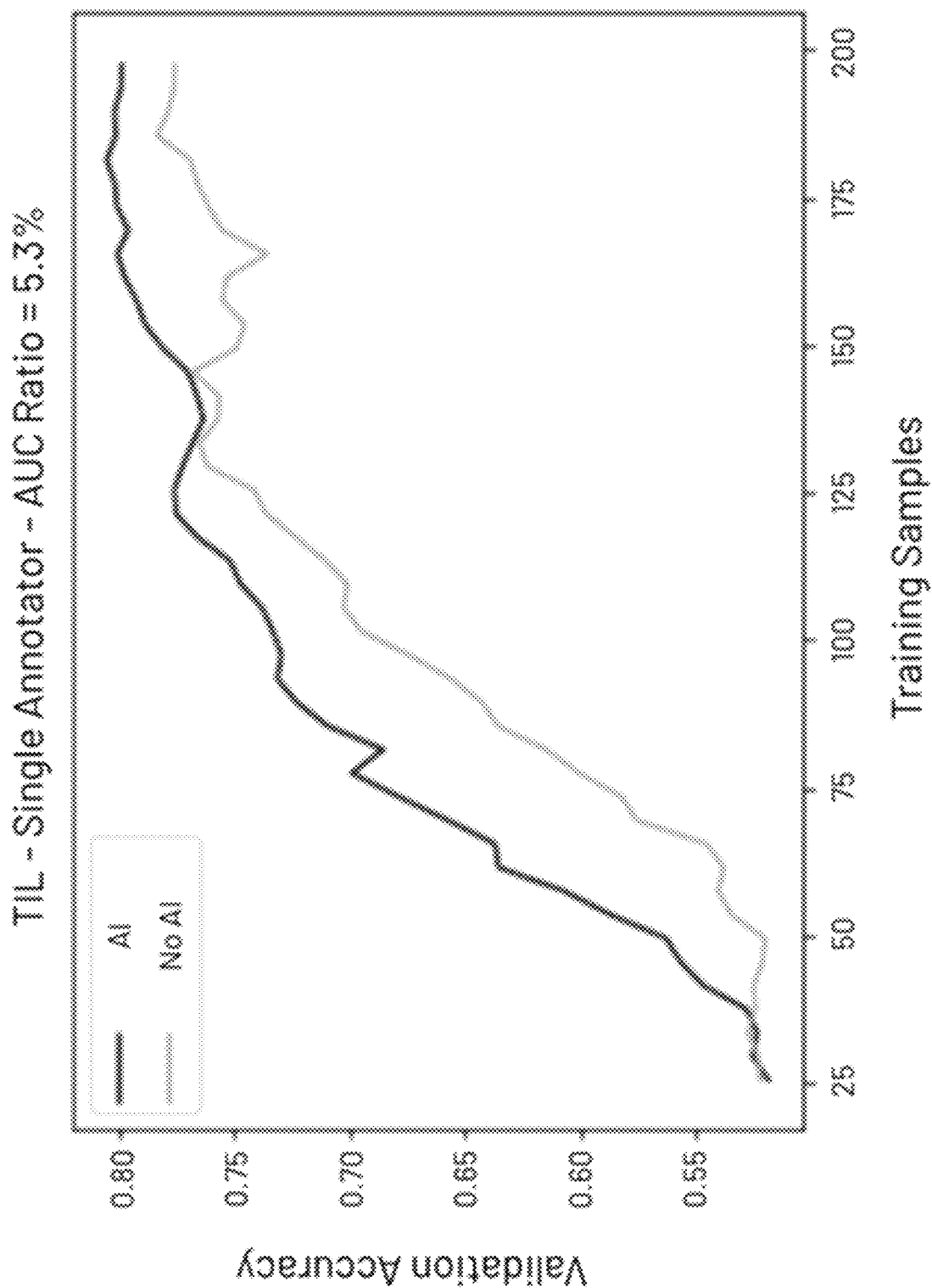
FIG. 8 illustrates experimental data demonstrating accuracy improvements that may be realized using the AI-enhanced data labeling system, according to one embodiment.

FIG. 8 is an example comparison plot of a dataset annotated with the AI-enhanced data labeling tool versus one annotated without. Here, the AUC ratio is 5.3%, and a model trained with 50, 75, and 100 training examples benefits from an 11%, 11%, and 5% boost in model validation accuracy, respectively. In benchmark machine learning competitions, top performing models typically win by fractions of a percent to single percentage points. Thus, this improvement is effectiveness is significant.

Computing System Architecture

Figure 9:
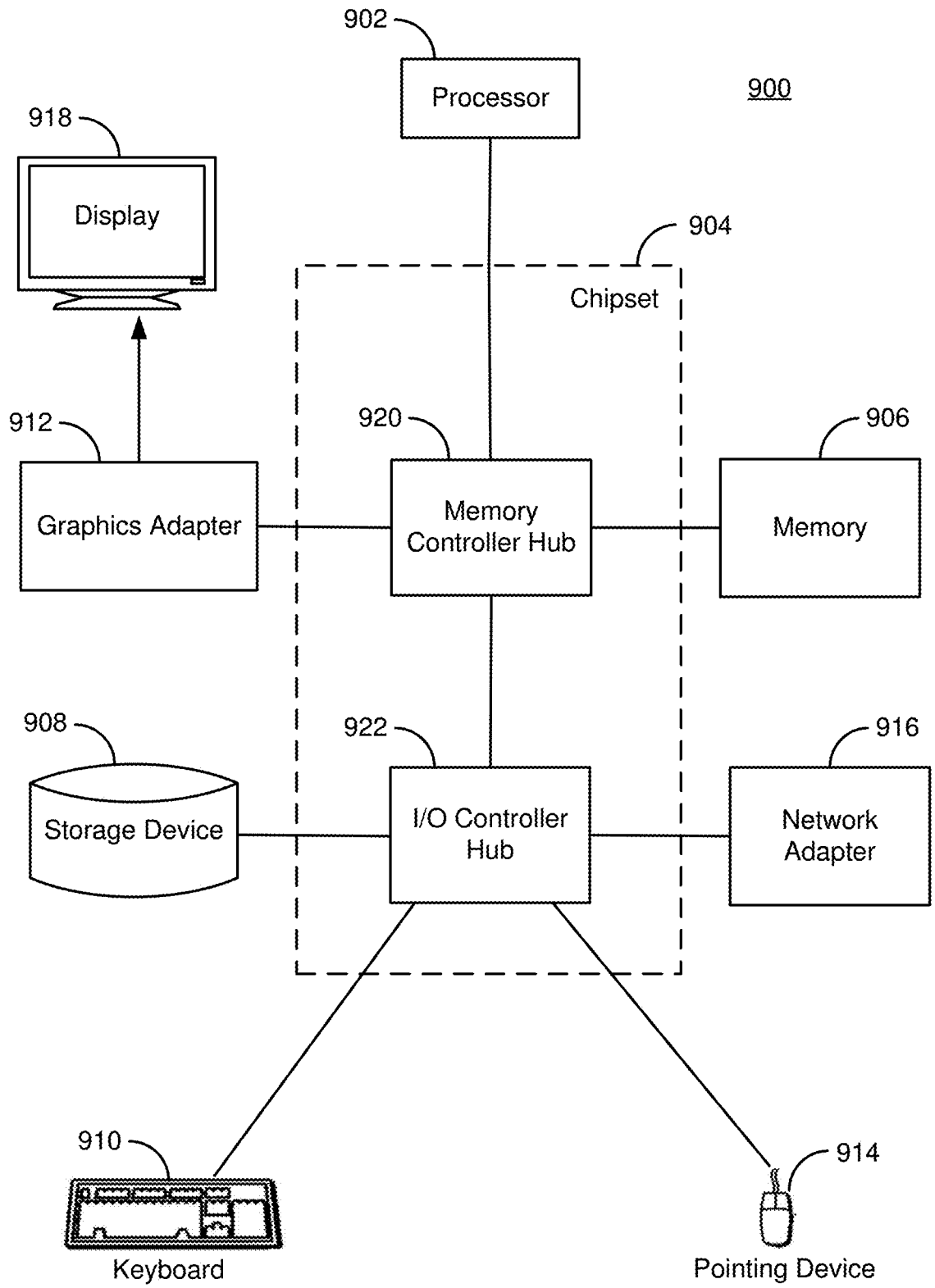
FIG. 9 is a block diagram illustrating an example of a computer suitable for use in the networked AI-enhanced data labeling system, according to one embodiment.

FIG. 9 is a block diagram illustrating an example computer 900 suitable for use as a server 110 or client device 140. The example computer 900 includes at least one processor 902 coupled to a chipset 904. The chipset 904 includes a memory controller hub 920 and an input/output (I/O) controller hub 922. A memory 906 and a graphics adapter 912 are coupled to the memory controller hub 920, and a display 918 is coupled to the graphics adapter 912. A storage device 908, keyboard 910, pointing device 914, and network adapter 916 are coupled to the I/O controller hub 922. Other embodiments of the computer 900 have different architectures.

In the embodiment shown in FIG. 9, the storage device 908 is a non-transitory computer-readable storage medium such as a hard drive, compact disk read-only memory (CD-ROM), DVD, or a solid-state memory device. The memory 906 holds instructions and data used by the processor 902. The pointing device 914 is a mouse, track ball, touch-screen, or other type of pointing device, and is used in combination with the keyboard 910 (which may be an on-screen keyboard) to input data into the computer system 900. The graphics adapter 912 displays images and other information on the display 918. The network adapter 916 couples the computer system 900 to one or more computer networks (e.g., network 170).

The types of computers used by the entities of FIGS. 1 and 2 can vary depending upon the embodiment and the processing power required by the entity. For example, the server 110 might include a distributed database system comprising multiple blade servers working together to provide the functionality described. Furthermore, some computers can lack some of the components described above, such as keyboards 910, graphics adapters 912, and displays 918.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and process for providing AI-enhanced labeling of image data. Thus, while particular embodiments and applications have been illustrated and described, it is to be understood that the described subject matter is not limited to the precise construction and components disclosed. The scope of protection should be limited only by the following claims.

What is claimed is:

1. A method for computer-assisted annotation of image data corresponding to an image comprising one or more biological structures, the method comprising:
   segmenting, by a machine-learned segmentation model, the image data into image portions, wherein each of the image portions comprise at least one of the one or more biological structures, by:
   selecting, based on a stain type that the at least one of the one or more biological structures in the image is stained with, the machine-learned segmentation model from a plurality of available models,
      wherein the machine-learned segmentation model is trained using a supervised learning technique with one or more manually segmented images; and
   applying the selected machine-learned segmentation model to the image data to identify the image portions;
   receiving user-generated labels for a first subset of the image portions while user-generated labels for a second subset of the image portions are unavailable;
   training a machine-learned classifier using the labeled first subset of the image portions;
   applying the machine-learned classifier trained using the first subset of the image portions to a second subset of the image portions to generate recommended labels for at least some of the second subset of the image portions,
      wherein the second subset of the image portions and the first subset of the image portions belong to the same image;
   labeling the second subset of the image portions based on user input accepting the recommended labels without user-generated labels for the second subset of the image portions; and
   in response to a threshold number of the second subset of the image portions being labeled, retraining the machine-learned classifier using the labeled second subset of the image portions that are labeled by the recommended labels directly generated by the trained machine-learned classifier and accepted by the user input without user-generated labels for the second subset of the image portions.

2. The method of claim 1, wherein the image is of a biological sample stained with a stain type.

3. The method of claim 1, wherein the machine-learned classifier is a neural network initialized by:

pretraining the neural network using a general dataset that includes a range of tissue and cell types, wherein the pretraining is not limited to generating labels of a same type as the recommended labels;
freezing the layers of the pretrained neural network; and
replacing one or more layers of the pretrained neural network with two or more unfrozen layers, wherein training the machine-learned classifier comprises adjusting the unfrozen layers while leaving the frozen layers unchanged.

4. The method of claim 3, wherein replacing one or more layers of the pretrained neural network with two or more unfrozen layers comprises replacing a final layer of the pretrained neural network with a pair of fully connected layers.

5. The method of claim 1, wherein the machine-learned classifier is iteratively retrained each time the threshold number of image portions have been labeled.

6. The method of claim 1, wherein the machine-learned classifier is retrained in parallel with an operator providing labels for additional image portions.

7. The method of claim 1, further comprising recommending, based on the labeled first and second subsets of the image portions, a third subset of the image portions to be labeled, wherein the third subset of the image portions, the second subset of the image portions, and the first subset of the image portions comprise image portions of image data corresponding to the same image.

8. The method of claim 7, wherein recommending the third subset of the image portions comprises:
obtaining feature vectors of unlabeled image portions and at least some of the labeled first and second subsets of the image portions;
identifying, using an active learning model, a subset of the unlabeled image portions that, upon labeling, are predicted to increase diversity among the labeled image portions; and
identifying a region of the image to label next based on the subset of the unlabeled image portions, the region including at least some of the subset of the unlabeled image portions.

9. A non-transitory computer-readable storage medium including executable computer program code that, when executed by a computing device, cause the computing device to perform operations comprising:
segmenting, by a machine-learned segmentation model, the image data into image portions, wherein each of the image portions comprise at least one of the one or more biological structures, by:
selecting, based on a stain type that the at least one of the one or more biological structures in the image is stained with, the machine-learned segmentation model from a plurality of available models, wherein the machine-learned segmentation model is trained using a supervised learning technique with one or more manually segmented images; and
applying the selected machine-learned segmentation model to the image data to identify the image portions;
receiving user-generated labels for a first subset of the image portions while user-generated labels for a second subset of the image portions are unavailable;
training a machine-learned classifier using the labeled first subset of the image portions;
applying the machine-learned classifier trained using the first subset of the image portions to a second subset of the image portions to generate recommended labels for at least some of the second subset of the image portions,
wherein the second subset of the image portions and the first subset of the image portions belong to the same image;
labeling the second subset of the image portions based on user input accepting the recommended labels without user-generated labels for the second subset of the image portions; and
in response to a threshold number of the second subset of the image portions being labeled, retraining the machine-learned classifier using the labeled second subset of the image portions that are labeled by the recommended labels directly generated by the trained machine-learned classifier and accepted by the user input without user-generated labels for the second subset of the image portion.

10. The non-transitory computer-readable medium of claim 9, wherein the image is of a biological sample stained with a staintype.

11. The non-transitory computer-readable medium of claim 9, wherein the machine-learned classifier is a neural network initialized by:
pretraining the neural network using a general dataset that includes a range of tissue and cell types, wherein the pretraining is not limited to generating labels of a same type as the recommended labels;
freezing the layers of the pretrained neural network; and
replacing one or more layers of the pretrained neural network with two or more unfrozen layers, wherein training the machine-learned classifier comprises adjusting the unfrozen layers while leaving the frozen layers unchanged.

12. The non-transitory computer-readable medium of claim 11, wherein the operation replacing one or more layers of the pretrained neural network with two or more unfrozen layers comprises replacing a final layer of the pretrained neural network with a pair of fully connected layers.

13. The non-transitory computer-readable medium of claim 9, wherein the machine-learned classifier is iteratively retrained each time the threshold number of image portions have been labeled.

14. The non-transitory computer-readable medium of claim 9, wherein retraining the machine-learned classifier is retrained in parallel with an operator providing labels for additional image portions.

15. The non-transitory computer-readable medium of claim 9, wherein the operations further comprise recommending, based on the labeled first and second subsets of the image portions, a third subset of the image portions to be labeled, wherein the third subset of the image portions, the second subset of the image portions, and the first subset of the image portions comprise image portions of image data corresponding to the same image.

16. The non-transitory computer-readable medium of claim 15, wherein recommending the third subset of the image portions comprises:
obtaining feature vectors of unlabeled image portions and at least some of the labeled first and second subsets of the image portions;
identifying, using an active learning model, a subset of the unlabeled image portions that, upon labeling, are predicted to increase diversity among the labeled image portions; and identifying a region of the image to label next based on the subset of the unlabeled image portions, the region including at least some of the subset of the unlabeled image portions.

17. An AI-enhanced data labeling system comprising: a datastore configured to store image data corresponding to an image; a machine-learned segmentation model configured to segment, by a machine-learned segmentation model, the image data into image portions, wherein each of the image portions comprise at least one of the one or more biological structures, by:
  selecting, based on a stain type that the at least one of the one or more biological structures in the image is stained with, the machine-learned segmentation model from a plurality of available models,
    wherein the machine-learned segmentation model is trained using a supervised learning technique with one or more manually segmented images;
  a machine-learned classifier configured to generate recommended labels for at least some of the image portions while user-generated labels for at least another subset of the image portions are unavailable;
  a display configured to present at least some of the image portions in conjunction with controls for labeling the displayed image portions; and
  an input device configured to enable a user to interact with the controls to label the displayed image portions,
  wherein the machine-learned classifier is initially trained using a subset of the image portions that are manually labeled, based on user input provided using the controls, and is iteratively retrained using the at least another subset of the image portions that are labeled at least some of the recommended labels generated by the machine-learned classifier and accepted by the user input without user-generated labels for the at least another subset of the image portions, wherein the subset of the image portions and the at least another subset of the image portions comprise image portions of image data corresponding to the same image.

18. The AI-enhanced data labeling system of claim 17, wherein the machine-learned classifier is a neural network initialized by:
  pretraining the neural network using a general dataset that includes a range of tissue and cell types, wherein the pretraining is not limited to generating labels of a same type as the recommended labels;
  freezing the layers of the pretrained neural network; and
  replacing one or more layers of the pretrained neural network with two or more unfrozen layers, wherein training the machine-learned classifier comprises adjusting the unfrozen layers while leaving the frozen layers unchanged.

19. The AI-enhanced data labeling system of claim 17, further comprising an active learning model configured to recommend, based on the subset of the image portions and additional image portions, further image portions to be labeled.

20. The AI-enhanced data labeling system of claim 19, wherein the active learning model being configured to recommend further image portions to be labeled comprises the active learning model being configured to:
  obtain feature vectors of unlabeled image portions and at least some of the labeled subset of the image portions and additional image portions;
  identify a subset of the unlabeled image portions that, upon labeling, are predicted to increase diversity among the labeled image portions; and
  identify a region of the image to label next based on the subset of the unlabeled image portions, the region including at least some of the subset of the unlabeled image portions.

* * * * *